United States Patent [19]
Roberson

[11] Patent Number: 5,348,102
[45] Date of Patent: Sep. 20, 1994

[54] LAWN EDGER WITH MULTI-DIRECTIONAL FORCED AIR STREAMS

[76] Inventor: Henry C. Roberson, 4844 Maxwell, Detroit, Mich. 48214

[21] Appl. No.: 59,499

[22] Filed: May 10, 1993

[51] Int. Cl.⁵ .................... A01D 34/84; A01D 34/62
[52] U.S. Cl. ...................... 172/15; 56/13.3; 30/DIG. 5
[58] Field of Search ............... 172/13, 14, 15; 56/256, 56/12.8, 13.3, 13.4; 299/39; 30/DIG. 5, 124; 83/99

[56] References Cited

U.S. PATENT DOCUMENTS

| | | | |
|---|---|---|---|
| 1,812,942 | 7/1931 | Gaines | 83/99 X |
| 3,441,089 | 4/1969 | Minton | 172/14 |
| 3,852,944 | 12/1974 | Zuercher | 56/12.2 |
| 3,977,475 | 8/1976 | Zugai | 172/15 |
| 4,037,667 | 7/1977 | Gonsalves et al. | 172/14 |
| 4,121,406 | 10/1978 | Quintel | 56/13.4 |
| 4,175,622 | 11/1979 | Summerfelt | 172/14 |

*Primary Examiner*—Randolph A. Reese
*Assistant Examiner*—Christopher J. Novosad
*Attorney, Agent, or Firm*—Basile and Hanlon

[57] ABSTRACT

A lawn edger generates a forced air stream which is divided into two separate air paths, one path discharging a first forced air stream behind a cutting blade of the edger to direct clippings generated by the cutter blade away from the edger and the underlying surface and a second path in which a second forced air stream is discharged in front of the cutter blade to clear the surface over which the edger is moved of debris. In an alternate embodiment, exhaust gasses from the drive motor are directed by a conduit into the two separate air paths.

11 Claims, 2 Drawing Sheets

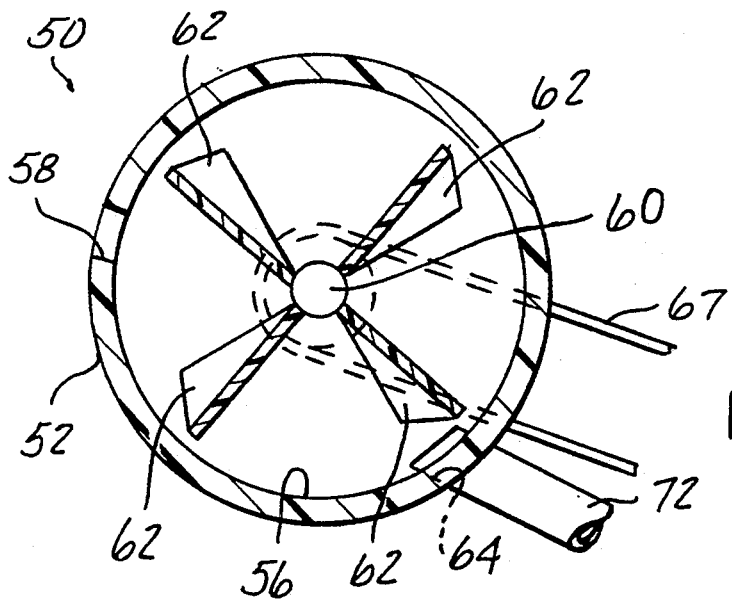
FIG-3
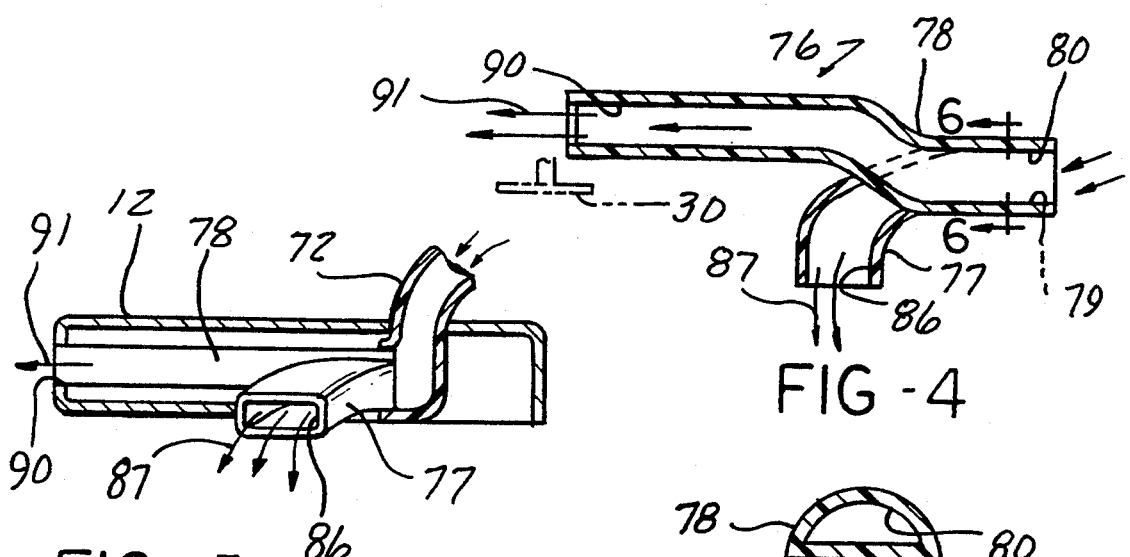
FIG-4
FIG-5
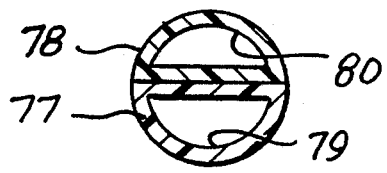
FIG-6
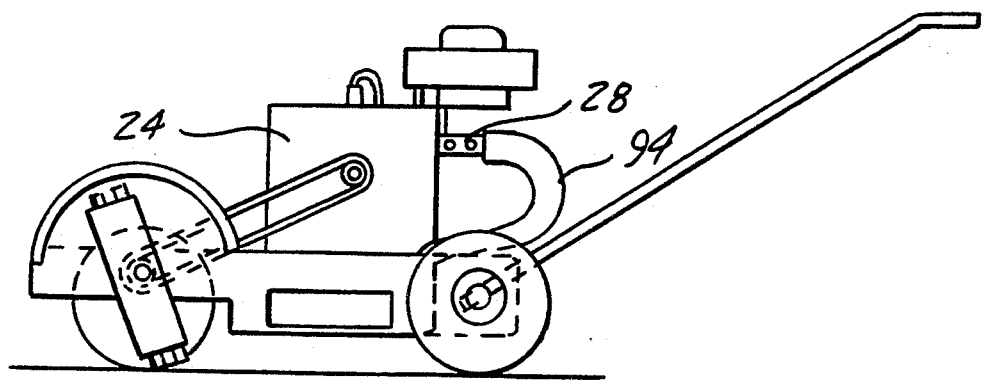
FIG-7

LAWN EDGER WITH MULTI-DIRECTIONAL FORCED AIR STREAMS

BACKGROUND OF THE INVENTION

FIELD OF THE INVENTION

The present invention relates, in general, to lawn edgers.

Lawn edgers are frequently employed to remove vegetation, such as grass, plants, weeds, etc., from the edge of a sidewalk or other surface so as to provide a neat, trimmed appearance to a lawn. Such edgers include a wheeled frame having a power source, such as a gasoline powered internal combustion engine or an electric motor, mounted thereon. A rotatable output shaft of the motor is coupled to a rotatable cutter blade which is generally oriented perpendicular to the plane of the sidewalk.

While such previously devised lawn edgers work satisfactorily in removing vegetation from the edges of a sidewalk, such lawn edgers in the course of their operation create debris in the form of clippings or particles of the vegetation cut by the cutter blade. The cuttings or particles are scattered over the sidewalk by the high speed revolutions of the cutter blade and, if a neat appearance is desired, such cuttings or particles must be removed, either by manual sweeping or by the use of a separate, hand carried blower.

In an attempt to eliminate the need for separately removing the scattered cuttings or particles, several attempts have been made to mount a blower or fan directly on a lawn edger which generates a forced air stream which is directed outward behind the cutter blade. Such blowers have been separate fans driven by the edger motor. The air stream has also been generated by directing the exhaust gasses of an internal combustion engine on the edger behind and outward of the cutter blade.

While such edgers having blowers mounted thereon are effective in automatically removing cuttings or particles generated by the cutter blade from the sidewalk or other surface as the edger is moved along the edge of a sidewalk, such devices fail to address the problem of pre-existing debris on the sidewalk or adjacent to the edge of the sidewalk in the path of movement of the edger. Such debris can clog the cutter blade and thereby decrease the cutting effect of the blade. Such debris, i.e., leaves, papers, etc. can also become lodged along the edge of the sidewalk and be drawn into the cutter blade as the edger is moved along the edge of the sidewalk.

Thus, it would be desirable to provide a lawn edger which overcomes the deficiencies of previously devised lawn edgers. It would be desirable to provide a lawn edger which automatically blows cuttings or particles generated by the cutter blade of the lawn edger off of a surface, such as a sidewalk, as such cuttings or particles are generated by the cutter blade. It would also be desirable to provide a lawn edger which generates an air stream in front of the cutter blade to prevent debris on or along the edge of a sidewalk or other surface from interfering with the cutting action of the cutter blade. Finally, it would be desirable to provide a lawn edger having these features which can be simply and economically manufactured.

SUMMARY OF THE INVENTION

The present invention is a lawn edger which generates multi-directional forced air streams for blowing cuttings cut by the edger and debris disposed on a sidewalk or adjacent to the edge of the sidewalk in front of the cutter blade away from the cutter blade.

In a preferred embodiment, the lawn edger of the present invention includes a wheeled frame movable in a first direction of movement over a surface, such as a sidewalk. A drive means is mounted on the frame and has a rotatable drive shaft. A cutter blade is also rotatably mounted on the frame and rotates about an axis transverse to the direction of movement of the frame. Means are provided for coupling the drive shaft of the drive means to the cutter blade to rotate the cutter blade. Means are coupled to the drive means for generating a forced air stream. Means are mounted on the frame and disposed in fluid flow communication with the air stream generating means for directing the forced air stream in a first flow path immediately rearward and transversely outward from the cutter blade, and in a second flow path generally forwardly of the cutter blade in the first direction of movement of the edger.

The air stream directing means generally comprises a first conduit extending from the air stream generating means through and below the frame. The first conduit is connected in fluid flow communication with the inlets of second and third conduits defining the first and second flow paths, respectively.

The second conduit extends from the inlet connection to the first conduit to a first outlet located rearward of the cutter blade. The third conduit extends from the inlet connection to the first conduit to a second outlet facing in the first direction of movement of the frame.

In one embodiment, the air stream generating means includes a housing mounted on the lawn edger and having an air inlet and an air outlet. A blower means is mounted in the housing for generating a forced air stream through the air outlet in the housing. The blower means preferably comprises a fan having a rotatable shaft and a plurality of radially extending blades mounted on the shaft.

Means are provided for rotating the fan shaft. Such rotating means preferably comprises a drive belt connected between the fan shaft and the drive shaft of the drive means mounted on the frame of the lawn edger.

In a second embodiment, the air stream generating means comprises a conduit having an air inlet connected to the drive means for receiving exhaust gasses under pressure from the drive means. The conduit has an outlet connected to the air stream directing means for directing the exhaust gasses to the air stream directing means.

The lawn edger of the present invention uniquely solves a deficiency in previously devised lawn edgers by providing a multi-directional forced air streams which blow cuttings or particles generated by the cutter blade of the lawn edger away from the cutter blade as such cuttings or particles are generated. More importantly, a forced air stream is directed forwardly of the cutter blade to remove debris on a sidewalk or other surface or adjacent to the edge of the sidewalk and to prevent such debris from contacting the cutter blade. This eliminates any possibility of such debris from clogging or decreasing the effect of the cutting action of the cutter blade and results in more efficient cutting action. The lawn edger of the present invention provides the multi-directional forced air streams in a simple and economical manner.

BRIEF DESCRIPTION OF THE DRAWING

The various features, advantages and other uses of the present invention will become more apparent by referring to the following detailed description and drawing in which:

FIG. 3 is a cross sectional view generally taken along line 3—3 in FIG. 2;

FIG. 4 is a cross sectioned, plan view of the air stream delivery means shown generally in FIG. 2;

FIG. 5 is a partially cross-sectioned side elevational view of the air stream delivery means;

FIG. 6 is a cross-sectional view generally taken along line 6—6 in FIG. 5; and

FIG. 7 is a side elevational view of a second embodiment of the lawn edger of the present invention.

DESCRIPTION OF THE PREFERRED EMBODIMENTS

Figure 1:
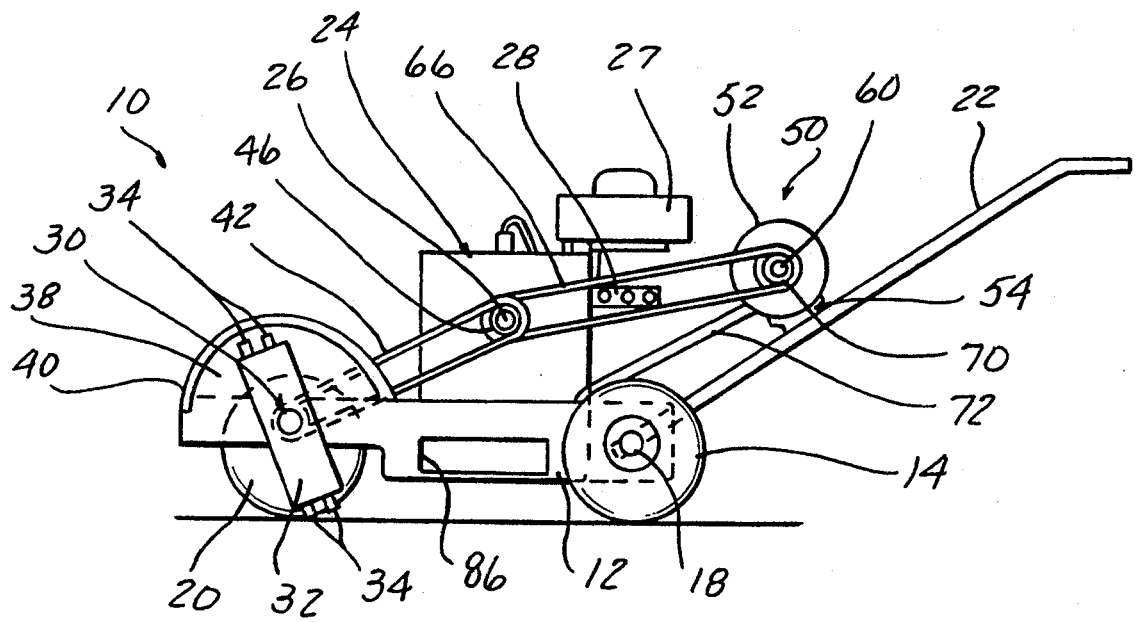
FIG. 1 is a side elevational view of a lawn edger constructed in accordance with the teachings of a first embodiment of the present invention.

Referring now to the drawing, there is generally depicted a lawn edger having multi-directional forced air stream to prevent debris from engaging the cutter blade of the lawn edger as well as to remove clippings or particles generated during the cutting action away from a sidewalk or other surface as the cuttings or particles are generated by the cutting blade of the lawn edger.

Figure 2:
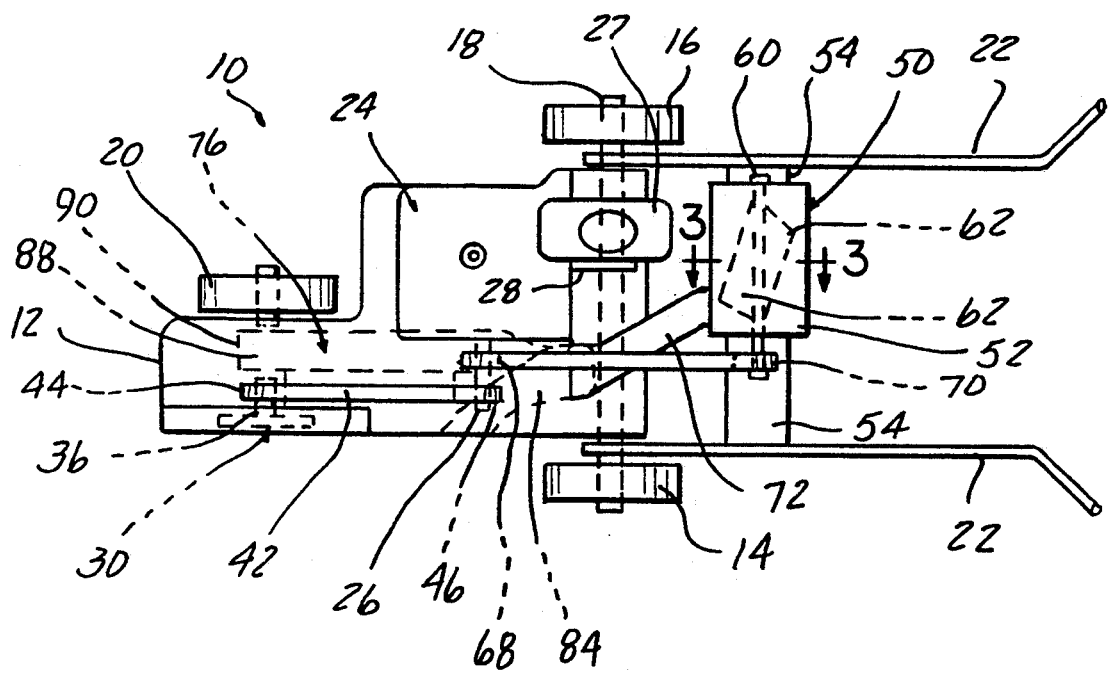
FIG. 2 is a plan view of the lawn edger shown in FIG. 1.

As shown in a first embodiment in FIGS. 1-4, a lawn edger 10 is provided with a conventional frame or base 12 of any suitable size or shape. A plurality of wheels are rotatably mounted on the frame 12 in any number and in any desired configuration. By way of example only, a pair of rear wheels 14 and 16 are rotatably mounted on an axle 18 extending through a rear portion of the frame 12. A single front wheel 20 is also rotatably mounted on a short axle to a front portion of the frame 12 as shown in FIG. 2. It will be understood that two pairs of front and rear located wheels may also be provided on the lawn edger 10. Alternately, a single front wheel and a single rear wheel may also be employed.

The wheels, 14, 16 and 20 enable the lawn edger 10 to be moved in a first direction of movement, or to the left in the orientation of FIGS. 1 and 2.

A handle 22 is attached to the frame 12 or to the axle 18 in a conventional manner. The handle 22 may have any shape such as the two separate arms shown in FIGS. 1 and 2 or a single arm, not shown, having a fork at a lower end attached to the frame 12 or axle 18.

A drive means denoted generally by reference number 24 is fixedly mounted on the frame 12. The drive means 24 preferably comprises a motor having a rotatable output or drive shaft 26. As shown in FIGS. 1 and 2, the drive means 24 may comprise a conventional gasoline powered internal combustion engine having a fuel tank 27 and an exhaust muffler 28 attached thereto in a conventional manner. Alternately, an electric motor may be used as the drive means 24 for the lawn edger 10 of the present invention.

A cutter blade 30 is rotatably mounted on the frame 12 of the lawn edger 10. By way of example only, the cutter blade 30 is formed of an elongated bar 32 with a plurality of cutting teeth 34 mounted on opposite ends. The bar 32 is connected to a shaft 36 which is rotatably mounted to the frame 12, and preferably, to a sidewall 38 of a guard or shroud 40 formed on a forward portion of the frame 12 and surrounding the circular path of rotation of the bar 32.

Means are provided for coupling the output or drive shaft 26 of the drive motor 24 to the rotatable shaft 36 of the cutter blade 30. Any suitable coupling means, such as a direct drive coupling, gears or a drive belt 42 as shown in FIGS. 1 and 2, may be used to couple rotation of the output shaft 26 of the motor 24 to the cutter blade 30. As shown by way of example only in FIGS. 1 and 2, the drive belt 42 extends around and between a pulley 44 mounted on the shaft 36 of the cutter blade 30 and a first pulley 46 mounted on the drive shaft 26 of the drive motor 24. In this manner, energization of the drive motor 24 causes rotation of the drive shaft 26 and a resulting rotation of the cutter blade 30.

According to a unique feature of the present invention, the lawn edger 10 includes means for generating multiple forced air streams. In a first embodiment shown in FIGS. 1, 2 and 3, the air stream generating means denoted generally by reference number 50 comprises a blower means formed of a generally cylindrical, closed housing 52. The housing 52 is fixedly mounted on the handle 22 by means of mounting brackets 54.

The housing 52 has a generally cylindrical shape with closed ends which form a closed, hollow, internal chamber 56. An air inlet 58 is formed at a suitable location in a side wall of the housing 52 for admitting air into the hollow chamber 56 within the housing 52. A rotatable shaft 60 extends longitudinally through the housing 52. The shaft 60 forms a part of a fan or blower and has a plurality of radially extending blades or impellers 62 formed thereon and extending radially outward therefrom. The blades 62 may have any suitable shape for generating a forced air stream upon rotation of the shaft 60. Further, the number of blades may also be varied to change the amount of air flow generated by the blower means 50.

Means are provided for rotating the shaft 60 in the housing 52 to generate a forced air stream through rotation of the blades 62 by drawing air through the air inlet 58 in the housing 52 and discharging a forced air stream through an air outlet 64 in the housing 52. The rotating means, by way of example only, may comprise a belt 66 extending around a second pulley 68 mounted on the drive or output shaft 26 of the motor 24 and a pulley 70 mounted on one outer end of the fan shaft 60 in the housing 52. In this manner, rotation of the drive shaft 26 results in a simultaneous rotation of the fan shaft 60 and thereby rotates the blades or impellers 62 in the housing 52 to draw air in through the air inlet 58 in the housing 52 and to discharge air under pressure as a forced air stream through the air outlet 64 in the housing 52.

It will also be understood that a separate motor, completely distinct from the drive motor 28, may also be employed to separately drive the blower means 50.

A conduit means 72 is connected at one end to the air outlet 64 in the housing 52 and forms part of a forced air stream directing means. The other end of the conduit means 72 is connected to a means for delivering the forced air stream in two separate paths. The conduit means 72 may be a hollow tube. As shown more clearly in FIGS. 4, 5 and 6, the air stream delivering means denoted generally by reference number 76 is mounted to and preferably below the frame 12. The air stream delivering means 76 is generally formed of two separate conduits 77 and 78. The conduits 77 and 78 may be formed of any suitable material, such as plastic, metal, etc.

As shown in FIG. 6, the conduit 77 has an air inlet 79 which is connected to one end of the conduit 72 which extends through an opening in the frame 12. The air inlet 79 has a D or semi-circular shape to form a circle when mounted adjacent to the inlet of the conduit 78 as described below. The conduit 77 forms a first air flow path extending from the inlet 79 to a first outlet 86 opening through the side of the frame 12, as shown in FIGS. 1 and 2, and is positioned immediately rearward of the cutting blade 30. The first air flow path discharges a first forced air stream 87 perpendicular to the plane of rotation of the cutter blade 30 to blow away and remove cuttings or particles generated by the cutting blade 30 away from the lawn edger 10 as the lawn edger 10 is moved in a first direction along the edge of a sidewalk or other surface. This eliminates the need to separately remove such cuttings or particles from the sidewalk or surface after the edging operation is completed.

The conduit 78 extends from a D-shaped inlet 80 to a second outlet 90 and forms the second air flow path. As shown in FIGS. 1, 2, 4 and 5, the second outlet 90 is positioned adjacent to the cutting blade 30 and is directed forward of the frame 12 in the normal direction of movement of the frame 12. A second forced air stream 91 exits through the second outlet 90 is thus discharged forward of the frame 12 thereby removing any debris which may be lying on the sidewalk or surface or adjacent to the edge of the sidewalk or surface away from the edger 10. This prevents such debris from engaging the cutter blade 30 which could clog the cutter blade 30 or decrease the cutting action and efficiency of the cutting blade 30.

It will be understood that the conduit 72 may be replaced by two separate, side-by-side conduits each formed as integral extensions of the conduits 77 and 78 and extending from the blower means 50.

Another embodiment of the lawn edger of the present invention is shown in FIG. 7. This embodiment is similar to that as shown in FIGS. 1-6 and described above except that it does not include the blower means 50. Rather, the means for generating a forced air stream in the second embodiment uses the gaseous emissions of the internal combustion engine 24 which exit under pressure through the muffler 28 of the engine. A conduit 94 is connected to the muffler 28 and transfers the exhaust gasses, under pressure, to the inlets 79 and 80 of conduits 77 and 78. The conduits 77 and 78 function in the same manner as described above and shown in FIG. 4 to separate the exhaust gas stream into two separate forced air streams 87 and 91 which are respectively directed sideways and forwardly of the frame 12.

In summary, there has been disclosed a unique lawn edger having multi-directional forced air streams for removing debris generated by the lawn edger during cutting as well as debris laying on the surface or adjacent to the edge of the surface prior to cutting. The multi-directional air streams automatically remove such debris from a sidewalk or other surface and eliminate the need for separate sweeping or blowing of such debris from the sidewalk after the edging operation has been completed. At the same time, any debris which may be laying on the sidewalk or adjacent to the edge of the sidewalk or other surface is removed from the path of the cutter blade prior to cutting. This prevents such debris from engaging the cutter blade and resulting in clogging or a decrease in the cutting efficiency of the blade. The lawn edger of the present invention is simple in construction and eliminates certain deficiencies found in previously devised lawn edgers, including lawn edgers having a forced air stream for blowing cut particles or cuttings outward from the cutting blade after such cuttings or particles have been generated.

What is claimed is:

1. An edger comprising:

a wheeled frame movable in a first operating direction over a surface;

drive means mounted on the frame and having a rotatable drive shaft;

a cutter blade rotatably mounted on the frame for rotation about an axis transverse to the first direction of movement of the frame;

means for coupling the drive shaft of the drive means to the cutter blade for rotating the cutter blade;

means, coupled to the drive means, for generating a forced air stream; and means, mounted on the frame and disposed in fluid flow communication with the air stream generating means, for directing the air stream into a first flow path located rearward of and projecting transversely outward from the cutter blade, and in a second flow path generally in the first direction of movement of the frame forwardly of the cutter blade.

2. The edger of claim 1 wherein the air stream directing means comprises:

conduit means, extending from the air stream generating means, for transmitting the forced air stream generated by the air stream generating means from the air stream generating means;

a first conduit mounted on the frame and connected at an inlet end in fluid flow communication with the conduit means;

a first air outlet formed in the first conduit and located rearward of the cutter blade;

a second conduit mounted on the frame and connected at an inlet end in fluid flow communication with the conduit means; and a second air outlet formed in the second conduit and opening to the first direction of movement of the frame.

3. The edger of claim 1 wherein the air stream generating means comprises:

a housing mounted on the frame and having an air inlet and an air outlet; and blower means, mounted in the housing, for generating the forced air stream through the air outlet in the housing.

4. The edger of claim 3 wherein the air stream directing means comprises:

conduit means, extending from the air stream generating means, for transmitting the forced air stream generated by the air stream generating means from the air stream generating means;

a first conduit mounted on the frame and connected at an inlet end in fluid flow communication with the conduit means;

a first air outlet formed in the first conduit and located rearward of the cutter blade;

a second conduit mounted on the frame and connected at an inlet end in fluid flow communication with the conduit means; and a second air outlet formed in the second conduit and opening to the first direction of movement of the frame.

5. The edger of claim 3 wherein the blower means comprises:

a fan having a shaft rotatably mounted in the housing and a plurality of blades mounted on the shaft and extending radially outward therefrom.

6. The edger of claim 5 further comprising:
means for rotating the shaft of the fan.

7. The edger of claim 6 wherein the means for rotating the shaft of the fan comprises:

a drive belt connected to and extending between the shaft of the fan and the drive shaft of the drive means.

8. The edger of claim 5 further comprising:
means, connected to the drive means and the shaft of the fan, for rotating the shaft of the fan during operation of the drive means.

9. The edger of claim 1 wherein the drive means comprises an internal combustion engine.

10. The edger of claim 1 wherein:
the drive means comprises an internal combustion engine emitting exhaust gasses under pressure;

the air stream generating means comprising a conduit having an air inlet connected to the drive means for receiving the exhaust gasses therefrom and an air outlet connected to the air stream directing means.

11. The edger of claim 10 wherein the air stream directing means comprises:

conduit means, extending from the air stream generating means, for transmitting the forced air stream generated by the air stream generating means from the air stream generating means;

a first conduit mounted on the frame and connected at an inlet end in fluid flow communication with the conduit means;

a first air outlet formed in the first conduit and located rearward of the cutter blade;

a second conduit mounted on the frame and connected at an inlet end in fluid flow communication with the conduit means; and a second air outlet formed in the second conduit and opening to the first direction of movement of the frame.

* * * * *